US011129077B2

(12) United States Patent
Bellis et al.

(10) Patent No.: US 11,129,077 B2
(45) Date of Patent: Sep. 21, 2021

(54) DIRECTIONAL ROUTER COMMUNICATION AND TRACKING

(71) Applicant: Comcast Cable Communications, LLC, Philadelphia, PA (US)

(72) Inventors: William Bellis, Arvada, CO (US); Christine Compton, Littleton, CO (US); Nirav Dave, Highlands Ranch, CO (US); Adam Eng, Denver, CO (US); David Eng, Louisville, CO (US); Brendan Lavery, Aurora, CO (US); Tamara Nowakowski, Parker, CO (US); Anupama Vaidya, Superior, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 279 days.

(21) Appl. No.: 14/796,507

(22) Filed: Jul. 10, 2015

(65) Prior Publication Data

US 2017/0013534 A1    Jan. 12, 2017

(51) Int. Cl.

| H04W 40/16 | (2009.01) |
|---|---|
| H04B 7/0408 | (2017.01) |
| H04B 7/06 | (2006.01) |
| H04W 40/06 | (2009.01) |
| H04W 40/20 | (2009.01) |
| H04W 40/02 | (2009.01) |
| H04W 84/12 | (2009.01) |
| H04W 16/28 | (2009.01) |

(52) U.S. Cl.
CPC .......... *H04W 40/16* (2013.01); *H04B 7/0408* (2013.01); *H04B 7/06* (2013.01); *H04B 7/0617* (2013.01); *H04W 40/023* (2013.01); *H04W 40/06* (2013.01); *H04W 40/20* (2013.01); *H04W 16/28* (2013.01); *H04W 84/12* (2013.01); *Y02D 30/70* (2020.08)

(58) Field of Classification Search
CPC .................................................. H04W 40/023
See application file for complete search history.

(56) References Cited

U.S. PATENT DOCUMENTS

| 3,852,765 | A |  | 12/1974 | Bresler et al. |
|---|---|---|---|---|
| 4,872,019 | A | * | 10/1989 | Chow .................... H01Q 15/08 |
|  |  |  |  | 343/753 |
| 6,262,687 | B1 |  | 7/2001 | Bai et al. |
| 6,683,567 | B2 |  | 1/2004 | De Champlain et al. |
| 7,173,571 | B2 |  | 2/2007 | Webb et al. |
| 7,953,372 | B2 |  | 5/2011 | Ofek et al. |
| 8,027,703 | B2 |  | 9/2011 | Girard et al. |
| 8,248,970 | B2 |  | 8/2012 | Abramov et al. |

(Continued)

FOREIGN PATENT DOCUMENTS

EP    2540108 B1    6/2014

*Primary Examiner* — Sulaiman Nooristany
(74) *Attorney, Agent, or Firm* — Banner & Witcoff, Ltd.

(57) ABSTRACT

Networking devices may allow for directed wireless communication. Such devices may comprise a movable antenna within a spherical housing having different ports associated with different positions, and may direct wireless communication beams in different directions to provide access to different zones by moving the antenna. A user may configure a system to prioritize or restrict zones or devices based on criteria. This prioritization may facilitate tiered services among users or devices.

8 Claims, 8 Drawing Sheets

(56) References Cited

U.S. PATENT DOCUMENTS

| | | | |
|---|---|---|---|
| 8,770,477 B2* | 7/2014 | Hefetz | G06Q 20/32 |
| | | | 235/380 |
| 8,830,910 B2 | 9/2014 | Skarp | |
| 2005/0260973 A1* | 11/2005 | van de Groenendaal | |
| | | | H04L 63/102 |
| | | | 455/411 |
| 2005/0266799 A1* | 12/2005 | Hara | H04B 7/0617 |
| | | | 455/63.4 |
| 2006/0038738 A1 | 2/2006 | Shtrom | |
| 2008/0084350 A1* | 4/2008 | Uno | H04W 16/28 |
| | | | 342/367 |
| 2011/0267255 A1* | 11/2011 | Locatori | H01Q 1/18 |
| | | | 343/872 |
| 2011/0269441 A1* | 11/2011 | Silver | H04W 48/04 |
| | | | 455/418 |
| 2011/0275378 A1* | 11/2011 | Kwon | H04W 72/00 |
| | | | 455/437 |
| 2013/0222515 A1* | 8/2013 | Abuan | H04N 7/14 |
| | | | 348/14.01 |
| 2015/0071181 A1* | 3/2015 | Nasir | H04W 28/20 |
| | | | 370/329 |
| 2016/0066344 A1* | 3/2016 | Kanno | H04W 48/02 |
| | | | 370/338 |
| 2016/0210638 A1* | 7/2016 | Kim | G06Q 30/02 |
| 2016/0277941 A1* | 9/2016 | Kim | G01S 13/931 |
| 2016/0309305 A1* | 10/2016 | Wilhelmsson | H04B 7/0408 |
| 2016/0341811 A1* | 11/2016 | Langlois | G01S 5/0252 |

\* cited by examiner

Front View

Fig 3

Bottom View

DIRECTIONAL ROUTER COMMUNICATION AND TRACKING

BACKGROUND

Aspects of the disclosure generally relate to computing hardware and computer software. In particular, one or more aspects of the disclosure relate to computing hardware and computer software for wireless communication among devices.

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand better means of connecting their devices, more effective means of communication in crowded environments, and new services leveraging those devices.

People may encounter situations where they need network access in difficult environments. For example, a homeowner may find that her wireless network fails to reach a bedroom on the far end of her house. In another example, a service provider may wish to provide internet service to multiple locations in an area. For example, a service provider may run communication lines to hundreds of apartments in a complex, or have to obtain complicated regulatory approval in order to run a communication line over a railroad line. There remains an ever-present need for improved ways of providing network connectivity.

SUMMARY

Aspects of the disclosure relate to various systems and techniques that provide for more convenient, functional, and easy-to-use ways for wireless routers to communicate to devices on a network.

Some environments may present difficulties for wireless communications. For example, it may be difficult to obtain strong wireless connections in a large apartment with numerous nearby networks providing interference. It may be desirable for a wireless router to track devices in order to direct communications in the most effective way possible. For example, a wireless router may have a limited amount of broadcast power due to hardware or regulatory constraints. In order to communicate with a device in a congested environment or in a remote location, the wireless router might direct a communication beam in the direction of the device.

Aspects of the disclosure may provide efficient, effective, and convenient ways of leveraging directed communications in order to maximize communication efficiency. In particular, a wireless router may use omnidirectional, directional, and/or motorized antennas to direct wireless communication beams at a device. The wireless router might track devices in order to direct communications to intended devices with maximum throughput and minimum interference. For example, a wireless router might be configured to direct a beam from a motorized directional antenna to a breakfast nook in the morning. In the evening, the router might direct the beam to a bedroom. The direction of the beams and the devices that receive them might be configured for a variety of preferences, and/or to support a variety of services.

In accordance with one or more aspects of the disclosure, a router may include a spherical housing around one or more antennas. The housing may include portals through which the router may direct communication beams. The router may also include multiple antennas, which may be directional or omnidirectional. The router may be capable of producing directed beams through beamforming, directional antennas oriented in different directions, or motorized antennas that can be reoriented to direct beams in different directions.

In some embodiments, a wireless router with at least one antenna may detect the presence of a device in the path of a wireless connection beam transmitted by the antenna(s). In response to the presence of the device, the router may direct the path of the beam from one position to another. So, for example, as a user moves from one room to another, the router can direct the beam to focus on the user. In some instances, the antenna may be a directional antenna, which may move relative to the router's frame. In other instances, the antenna may be an omni-directional antenna, which may use a technique such as beamforming to direct the beam.

In some embodiments, the router may be able to detect the device moving in two or three dimensions. The router may detect a change in the signal strength of a beam, and/or sense the device moving from a first beam in one direction to a second beam in a second direction. In some instances, when the device moves, the router may direct the beam to follow it. In other instances, the router may redirect power from one beam in a first direction to another beam in a second direction, to use more power for the beam(s) that target the user's current location. The router may log of the position of the device as it moves. In some instances, the router could be configured to prioritize devices, and may choose which devices to follow based on that prioritization.

In some embodiments, the router may be configured with different zones or areas. For example, a router may be configured with a living room, a bedroom, and a breakfast nook. Rules could be enabled for the zones, which may promote or restrict access at different times of day or to different client devices. This may be used to create restricted zones or times in which access is blocked and/or logged. For example, if users go to bed at 10 pm, then the router can be configured to concentrate the wi-fi beam coverage to the bedrooms after 10 pm, to help ensure that the wireless energy is directed to where the users are located.

In some embodiments, the router may facilitate shared wireless communication. Using directed communication beams, the router may establish a wireless communication link to another router. For example, the router may dedicate one of multiple antennas to creating a wireless bridge to another router while using the remaining antennas to establish a local network. If a wireless bridge is not intended, two routers may intelligently direct communication beams away from one another so as to minimize interference.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

According to some aspects described herein, a system may allow for wireless communication among multiple devices directed across multiple zones. In response to increasing crowding in the wireless spectrum, directed wireless communications may increase wireless communications quality while decreasing disruption. As described herein, a system may allow for wireless beamforming using directional or omni-directional antennas for directed communication with decreased interference. Using a method of zone configuration, the beamforming may allow for an intelligent configuration of a wireless network within a home. Further, a wireless router may intelligently identify the location of client devices or routers to facilitate the usage of enhanced wireless services. Those services may include distributed wireless networks, prioritized wireless service for certain customers, or wirelessly-based security systems.

Figure 1:
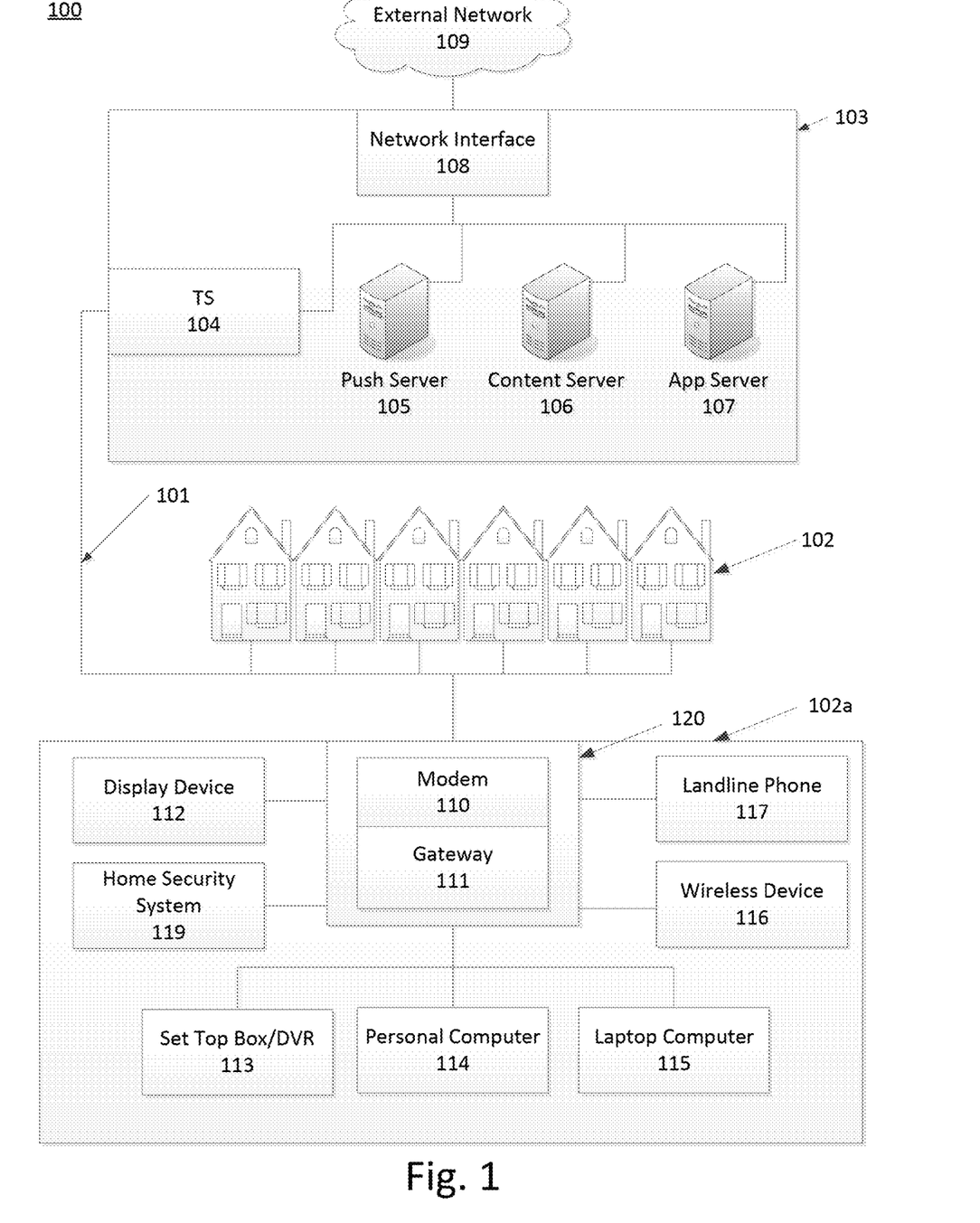
FIG. 1 depicts an example network environment in which one or more aspects of the disclosure may be implemented.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term premises is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The premises 102, such as the example home 102a, may include an interface 120, which may include a modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. In certain implementations, the modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102a to communicate with the local office 103, the one or more external networks 109, or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device.

Figure 2:
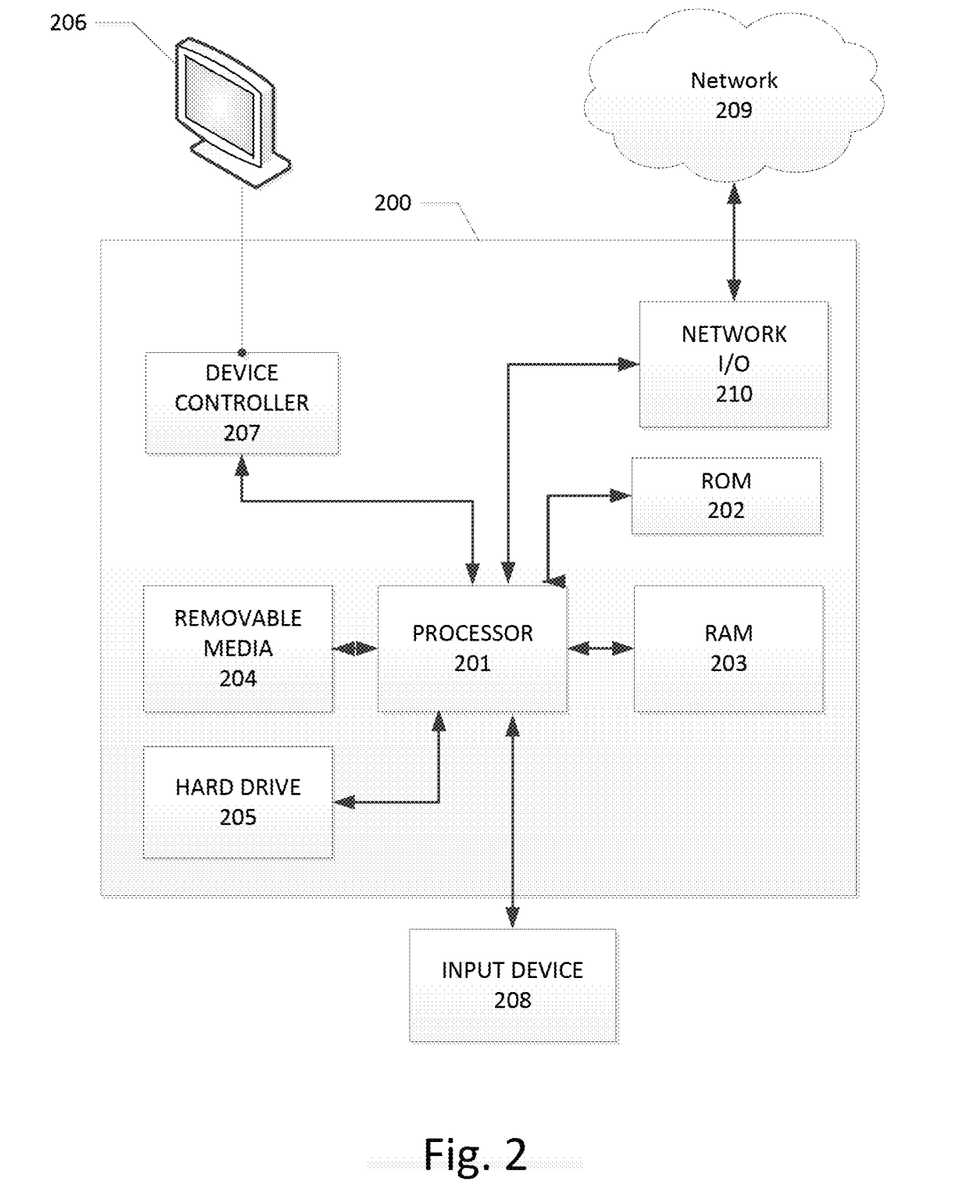
FIG. 2 depicts an example software and hardware device on which various aspects of the disclosure may be implemented.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

Figure 3:
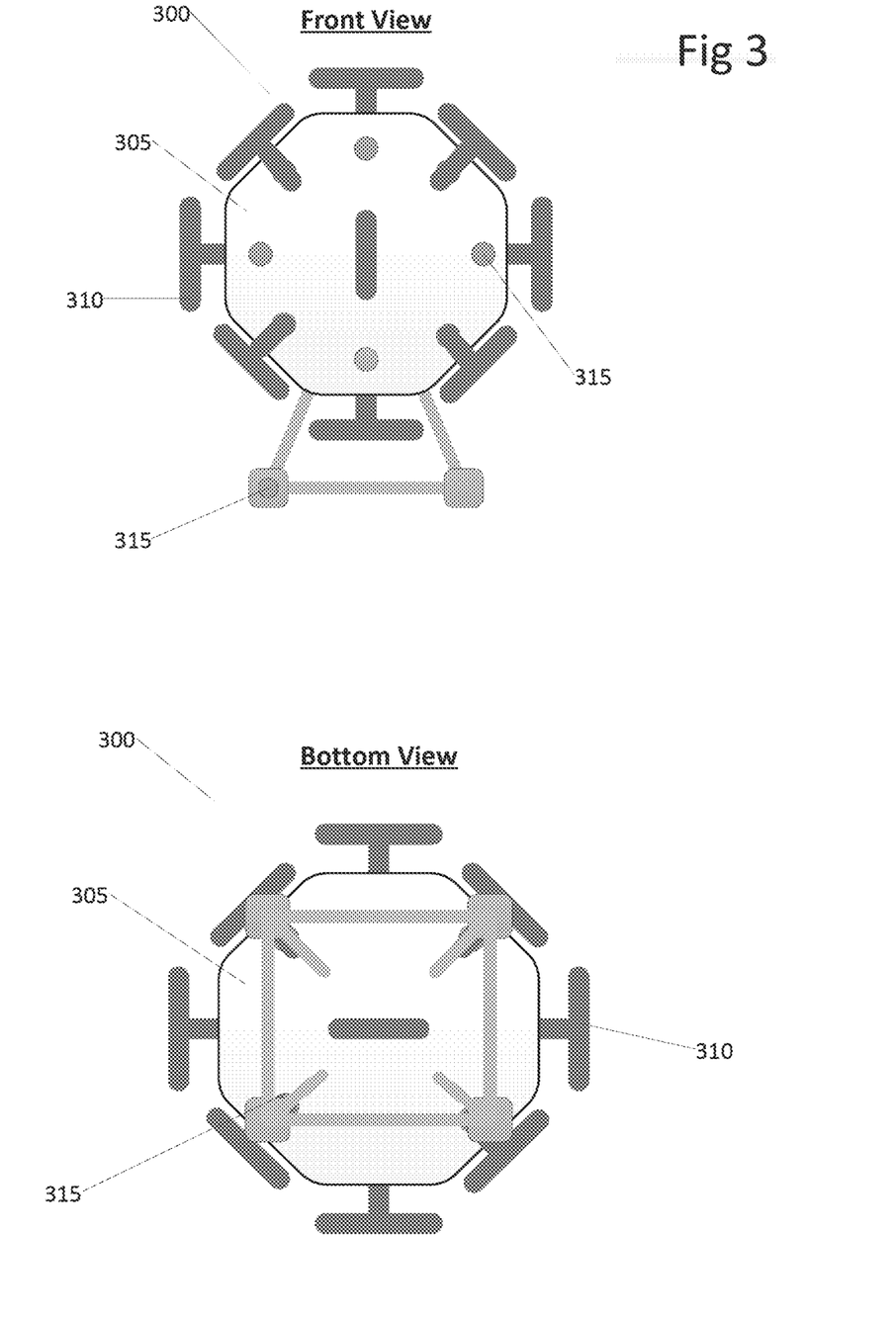
FIG. 3 an example of a networking device.

FIG. 3 depicts an example of a networking device. A networking device 300 may be a wireless router. In some instances, the networking device 300 may be implemented as a device 200. The networking device 300 may include one or more antennas 310. The antennas may be directional or omni-directional, and may be capable of directed wireless communication. In some embodiments, the networking device 300 may include a housing 305 around the antennas 310. The housing may be situated on a stand 315. The antennas may have one or more associated indicator lights 315.

Numerous antenna configurations are possible. In some embodiments, such as that depicted in FIG. 3, the casing may hold antennas oriented in a variety of directions. In other embodiments, the antennas depicted in the figure may be replaced with ports, and/or the antennas 310 may be placed inside the housing. In some instances, the antennas may be motorized, such that the networking device 300 may change the orientation of one or more antennas. In embodiments that use ports, this may alter the direction of communications beams passing through the ports. In many instances, through the usage of directional antennas, ports, or other means, the networking device 300 may direct wireless beams for communication in a specified direction and/or area.

Figure 4:
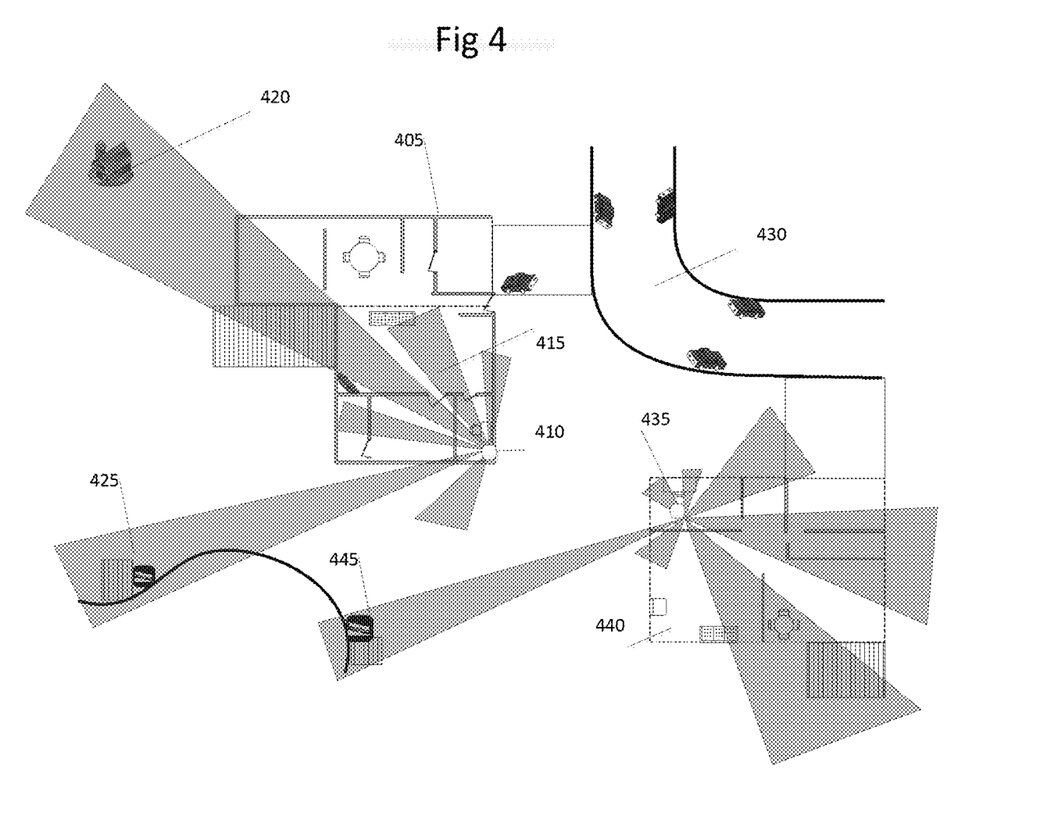
FIG. 4 depicts an example environment for directed networking.

FIG. 4 depicts an example environment for directed networking. A home 405 may be occupied by one or more users in possession of a networking device 410. For example, a family of four may live in a two bedroom home, and lease a wireless router from a service provider. In some instances the home 405 may be one of the premises 102.

The networking device 410 may direct a plurality of beams 415 in different directions and/or areas. For example, separate wireless beams may be directed to each bedroom in a home, a living room, a guest house 420, and a dock 425. The beams may be directed at different strengths. For example, a beam to a nearby bedroom may be given a low transmission power (such that beam strength may depend on the proximity of the room being covered, or on the outer contours of the premises walls), while a beam to the guest house 420 may be given a high transmission power. This may have the advantage of delivering wireless power to the areas where it is most needed. For example, a region may have regulatory limits on the amount of wireless power that can be used by a networking device 410. By increasing the power to antenna servicing a guest house 420 and minimizing power to a nearby bedroom, the wireless network is available where needed while not exceeding regulatory power constraints. Further discussion of the configuration for wireless connections in different directions and/or areas may be found in FIG. 8 and FIG. 9 below.

In some embodiments, wireless beams may be directed away from certain directions and/or areas. For example, a neighborhood may have a public area 430, a nearby neighbor networking device 435, and a neighbor dock 445. The networking device 310 may direct wireless beams away from the public area 430 to protect wireless security by minimizing signal strength in public area 430. The networking device 410 may also direct wireless beams away from the nearby neighbor networking device 435 to avoid interference with the neighbor networking device (and to discourage wi-fi theft of signal). The networking device 410 may also direct wireless beams so as to avoid interfering with an area serviced by nearby neighbor networking device 435. For example, neighbor networking device 435 may have a strong beam directed at a neighbor dock 445. The neighbor dock 445 may be on the other side of a yard where wireless access is desired. In order to reduce interference, networking device 410 may reduce the strength of a beam in the direction of neighbor dock 445 so as to cover the grassy area without interfering with wireless signals sent to the neighbor dock 445.

Figure 5:
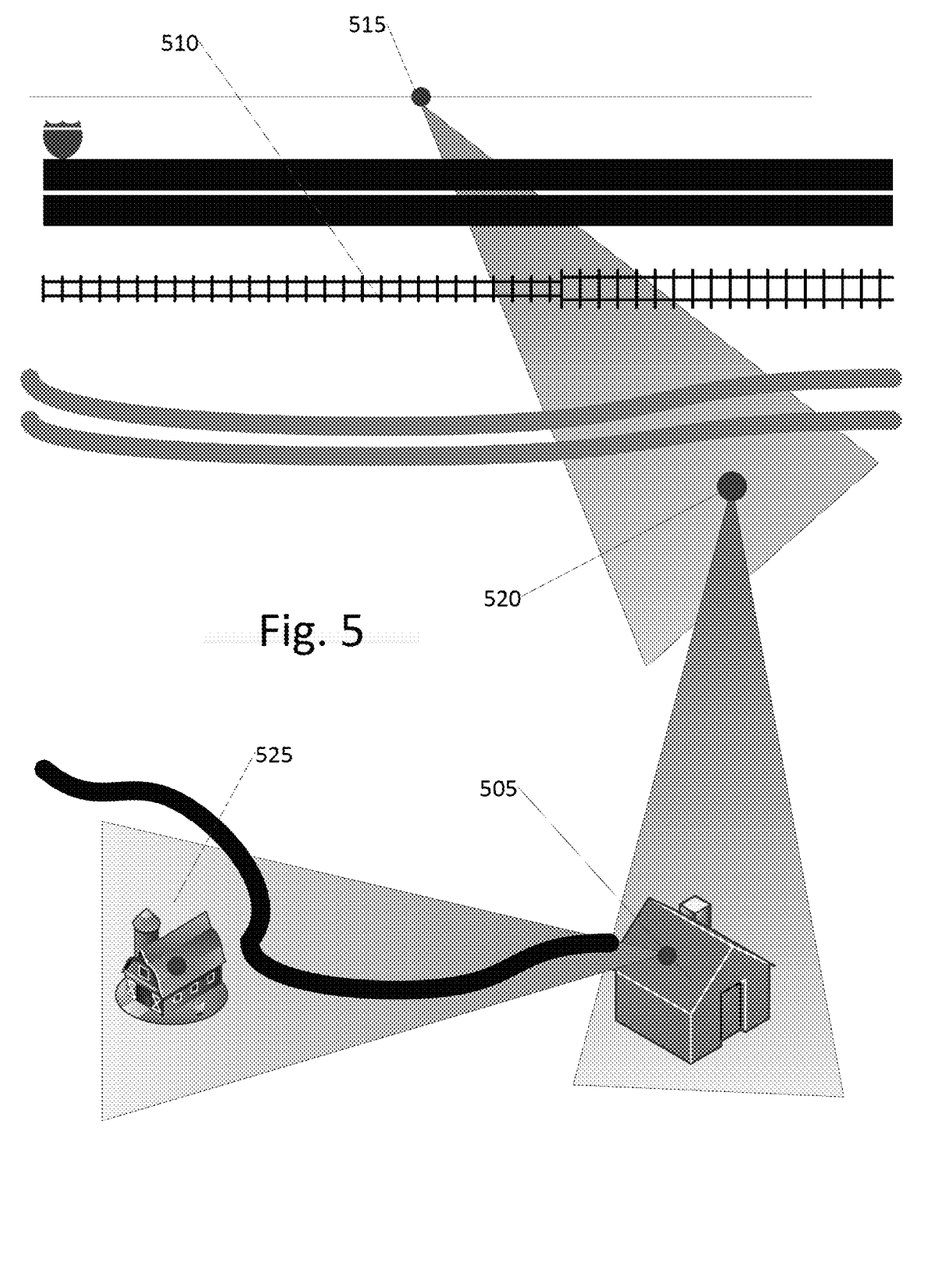
FIG. 5 depicts an example environment for distributed networking.

FIG. 5 depicts an example environment for distributed networking. In many instances, it may be difficult to supply network access to all potential clients. For example, a distributor may wish to connect a client location 505 to their data network. However, obstacles 510 may sit between the client location 505 and a network access 515. Regulations may restrict the ability for a distributor to run communication lines from network access 515 to the client location 505. For example, a distributor may have to overcome regulatory or physical constraints to run network communication lines over a highway, a railroad line, or a river. In order to establish communication between the client location 505 and the network access 515, the distributor may instead use a distributed wireless network.

A networking device 300 may direct a communication beam so as to create a wireless mesh network from a network access 515 to a client location 505. The wireless mesh network may allow nodes to share resources and/or pass along messages to extend network coverage. A communication beam may have the advantage of providing high speed data service while easily traversing the obstacles 510 and the constraints they impose. A distributor may direct a wireless beam from network access 515 to an access point 520 to create a wireless communication link. The network access point 520 may be an additional networking device 300, with one antenna directed to the network access 515, and another antenna directed to the client location 505. The access point 520 may then bridge the communication from the network access 515 internally to the antenna directed at the client location 505 and establish a link between the network access 515 and the client location 505.

In some embodiments, distributed networking may include one client location providing service to another client location. For instance, both a client location 505 and a neighboring client location 525 may be equipped with a networking device 300. The client location 505 may have one antenna directed to the access point 520, multiple antennas directed to provide a local network around the client location 505, and/or another antenna directed to the neighboring client location 525. The client location 505 may then bridge the connection with the access point 520 to the neighboring client location 525 using its antennas directed toward each location. This may have the advantage of providing a distributing network solution allowing for data services to multiple locations without the need for a wired network between the locations. Because the networking device 300 allows for antennas to be dedicated to providing these links, the distributed network may be accomplished using standard client equipment that can dedicate antennas to bridging while still using other antennas to provide a local network for a client.

Figure 6:
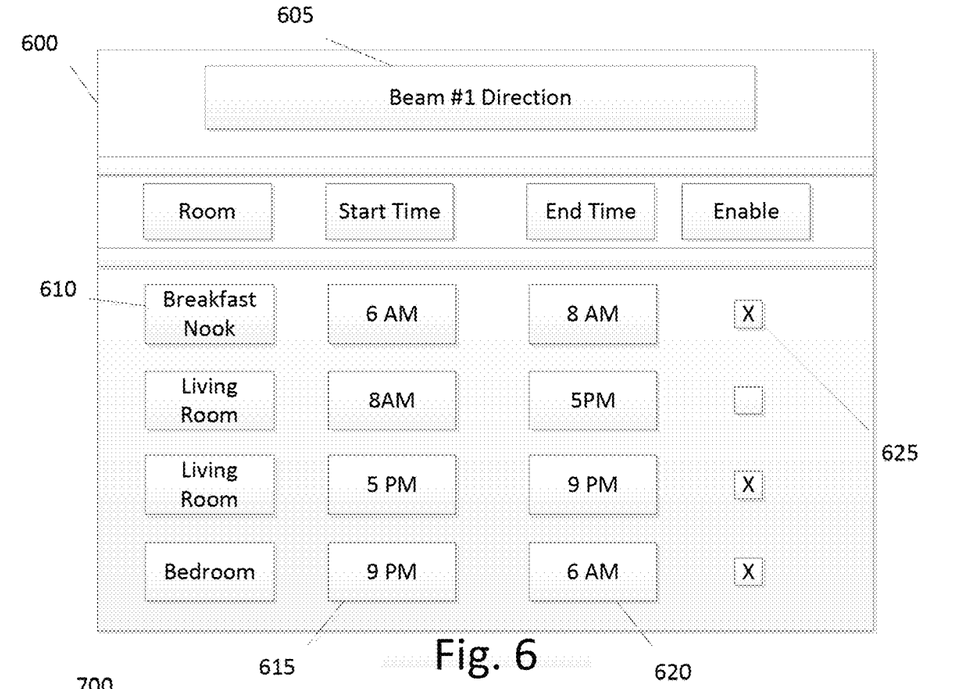
FIG. 6 depicts an example of directed communication schedule configuration.

FIG. 6 depicts an example of a zone configuration schedule. A networking device 300 may direct a wireless beam toward different areas at different times of day. For example, a networking device 300 may have a first wireless beam 605 for configuration. Since there may be multiple antennas, there may be a separate configuration for each antenna. The antenna configuration may direct a wireless beam from the antenna at a room 610 from a start time 615 until an end time 620. Because a wireless beam has been directed at the room 610, that room may receive a heightened level of wireless signal strength. Further, a user may configure a beam away from a room or to be disabled. This may have the advantage of restricting access to a user's network at a time or location the user does not intend, which may increase security and control over who can access to the user's network. If a beam is disabled, it may either turn off or remain on and disable access. If access is disabled, the room may be treated as a restricted zone and any attempted access may be logged. Further configuration is also possible. In some instances, a particular room may have certain security settings. For example, a device in a child's room may only have access to certain URLs.

The following is one example configuration of the above. A user may configure a first beam to direct a signal at a breakfast nook from 6 AM until 8 AM when a user and her family are eating breakfast. This may allow for the user's family to receive strong signal strength in an area that is normally too far away to work effectively. From 8 AM until 5 PM, the user's family may all be at work or school, and so the user may configure the antenna to be disabled. This may prevent unauthorized access to the user's network while the user is not home. The user may configure the antenna to direct a beam toward a living room from 5 PM until 9 PM. This may allow the family to receive maximum signal strength while they are spending time together. Finally, the user may configure the antenna to direct a beam toward the user's bedroom from 9 PM until 6 AM. This may allow the user to receive strong wireless signal while lying in bed, while directing a wireless beam away from a child's bedroom (thus restricting the child's internet access).

Figure 7:
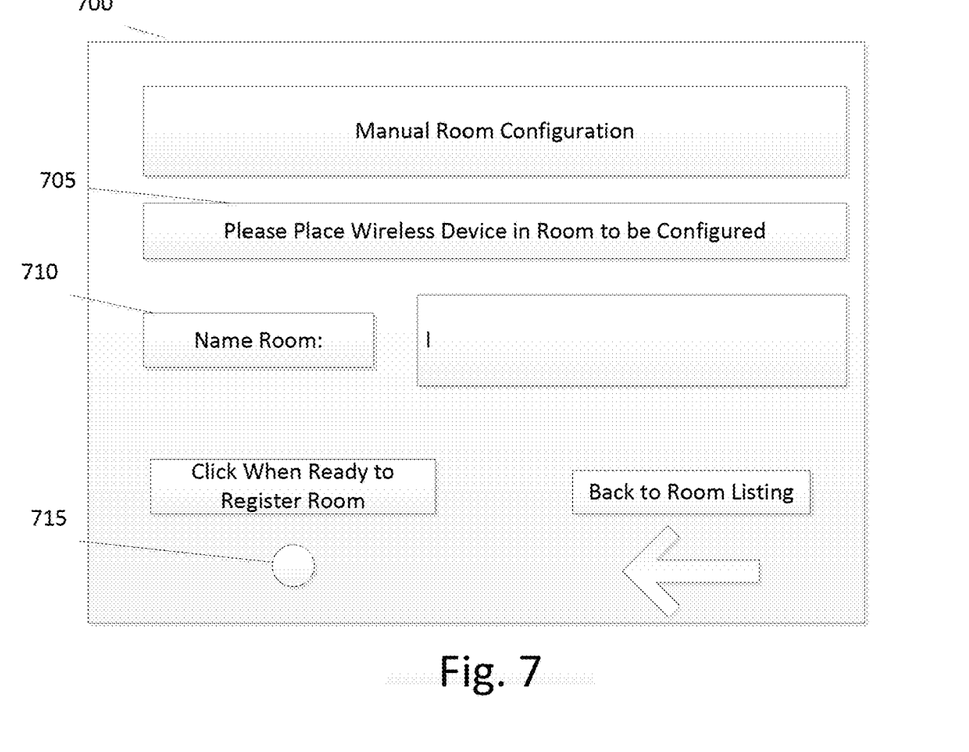
FIG. 7 depicts an example of manual zone configuration.

FIG. 7 depicts an example of a configuration screen presented to a user when setting up rooms. This screen may allow a user to configure a networking device 300 to identify areas or zones to receive wireless communication. At step 705, the screen may ask that a user place a wireless client device in an area to be configured. When the device is in the area, the networking device 300 may perform beam forming and/or move an antenna until it identifies a direction with maximum signal strength. This allows the networking device 300 to know what direction an area is in. The user may then assign a name 710 to the stored direction, and register the direction and name in local memory by pushing a button 715. For example, while registering a phone placed in a living room, a "living room" name could be stored so that the user may configure beams directed toward the living room in their home as described in FIG. 6. This may have the advantage of giving real world context to directed wireless communication that would otherwise be impossible for a networking device to know on its own.

Figure 8:
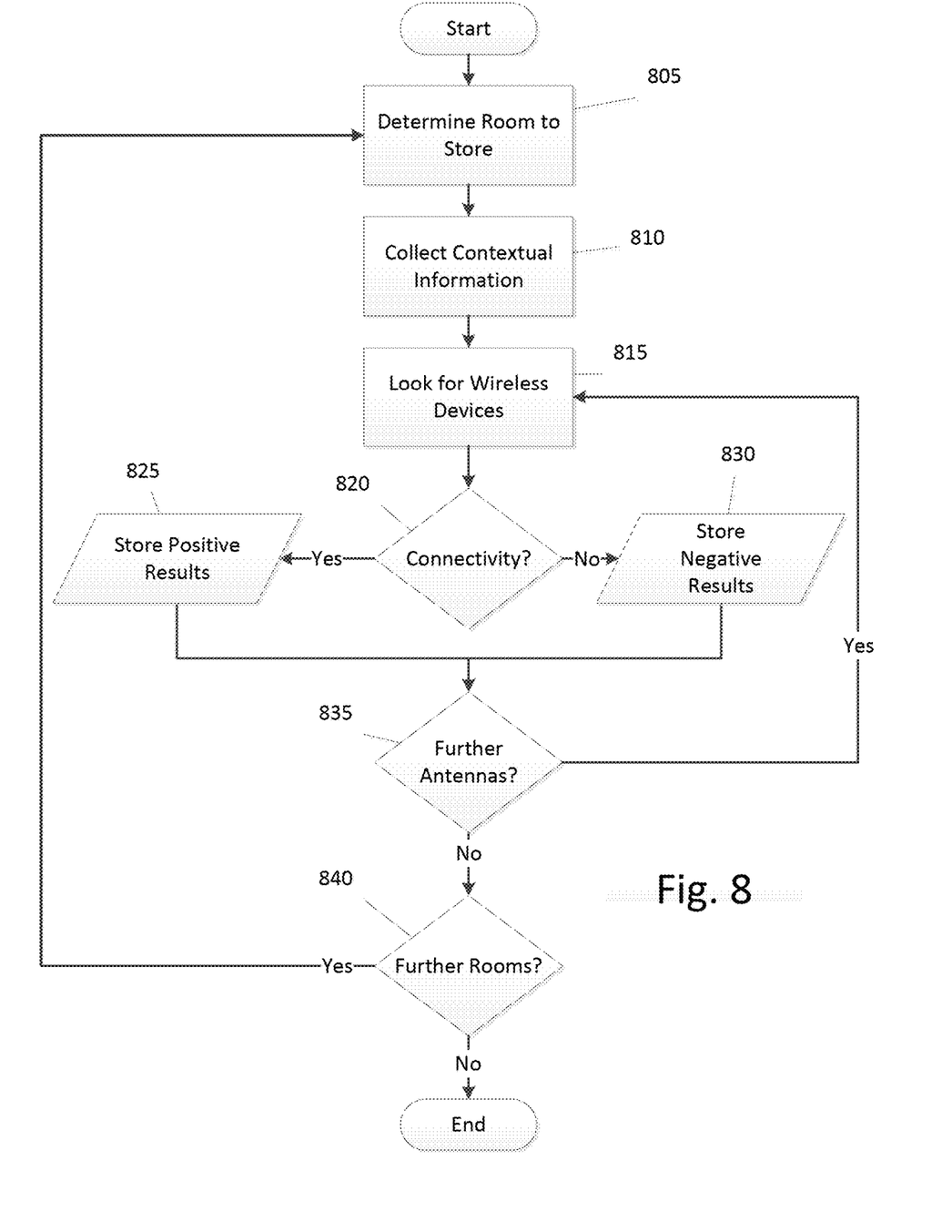
FIG. 8 depicts an exemplary method for room configuration.

FIG. 8 depicts an exemplary method for room configuration. This method may allow a networking device 300 to automatically identify areas in need of wireless activity and add them to a connectivity log. At step 805, a networking device 300 may determine to store configuration information for a room. In some instances, a user may configure the room to be stored, such as by using the screen in FIG. 7. In other instances, the networking device 300 may take data at intervals. For example, a router could sample networking activity every 30 degrees, treating each sample as a "room." In some instances, the networking device 300 may use the segments with the most connectivity as detected in step 820 for assigning rooms as in FIG. 7. At step 810, the networking device 300 may collect contextual information. This may be information about the room to be stored, the time of day, or other information that may be useful for configuration. For example, the networking device 300 may collect information about a room to be stored from a user, such as name information in a screen as in FIG. 7. In another example, the networking device 300 may collect the signal-to-noise ratio (SNR) and the time of day.

At step 815, the networking device 300 may look for wireless devices. For example, the networking device 300 may monitor traffic on all possible channels to determine if devices are communicating in an area. In another example, the networking device 300 may send a wireless ping and wait for responses. At step 820, the networking device 300 may determine if there is any connectivity. For example, the networking device 300 may detect the presence of transmission packets, or may receive responses from wireless devices. If connectivity is detected, the networking device 300 may record the connectivity at step 825. For example, the networking device may record detected devices, how many packets were detected, and/or the strength of wireless signals received from detected devices in local memory. If there is no activity, the networking device 300 may record the lack of connectivity in local memory at step 830.

At step 835, the networking device 300 may determine if more antennas should be configured. In some instances, antennas may have different wireless characteristics. For example, one antenna may be oriented in one direction, and another antenna may be oriented in another direction. By stepping through each antenna individually, the networking device 300 may identify antennas with the best ability to service a room, such as antennas with the strongest signal strength. If there are further antennas to be configured, the networking device 300 may configure the next antenna at step 815. Else, the networking device may proceed to step 840. At step 840, the networking device may determine if there are further rooms to be configured. For example, the networking device 300 may need to check for connectivity at another 30 degrees, or step to another room as configured by a user. For example, a user may have configured a number of rooms as in FIG. 7. If more rooms should be configured, the networking device returns to step 805. Else, the networking device 300 may end configuration.

Figure 9:
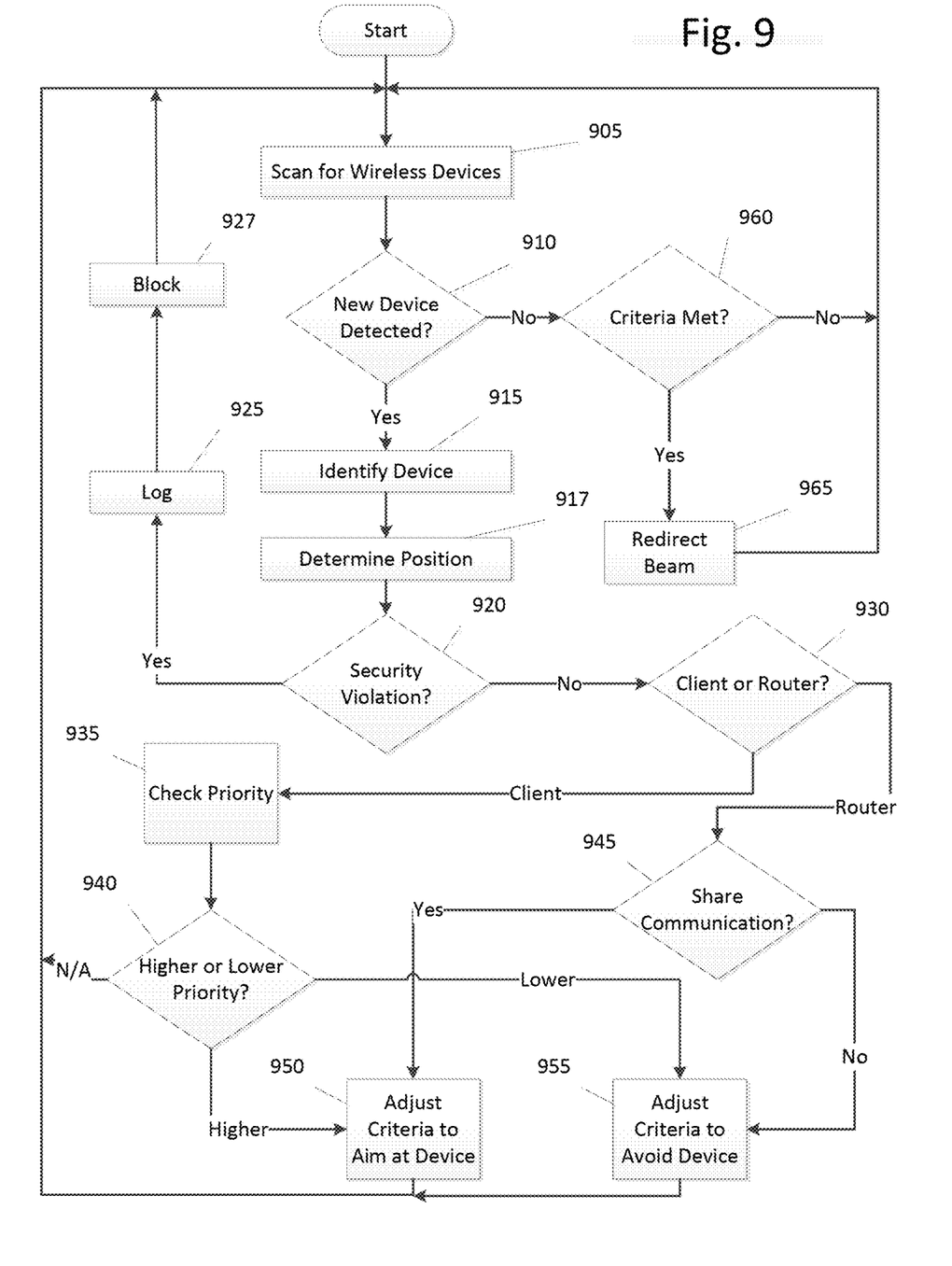
FIG. 9 depicts an exemplary method for directed networking.

FIG. 9 depicts an exemplary method for directed networking. A networking device 300 may perform the exemplary method to perform functions such as increasing wireless connectivity, securing communications, prioritizing client devices, and/or establishing shared wireless communication.

At step 905, a networking device 300 may scan for wireless devices. The networking device may detect the presence of wireless devices in the area. For example, the networking device 300 may detect the presence of transmission packets, or may receive responses from wireless devices. At step 910, the networking device 300 may compare detected wireless devices against known wireless devices. For example, the networking device 300 may compare detected devices against a MAC table. If a new wireless device has been detected, the networking device may proceed to identifying the device at step 915. If a new wireless device has not been detected, the networking device may proceed to adjusting wireless beams in response to a criteria starting at step 960.

At step 915, the networking device 300 may identify a detected device. The networking device 300 may obtain information from the detected device, consult a service provider for an identification corresponding to a MAC address, and/or check a user configuration such as that supplied in FIG. 7. This identification may identify the type of device, and/or the unique device connected. Collected information may be stored in a table in local memory.

At step 917, the networking device 300 may determine the position of the detected device. In some instances, the networking device may determine a location by analyzing the signal strength relative to certain beams. For example, for a networking device 300 with multiple static directed antennas, the networking device 300 may determine a position based on the static antennas with the strongest signal strength to the detected device. In another example, the networking device 300 may triangulate the position of a device using multiple antennas. In one embodiment, one or more motorized antennas may adjust their beams until the signal strength to the detected device is maximized. The networking device 300 may then triangulate the position of the detected device in multiple dimensions based on the strength and direction of the beams.

At step 920, the networking device 300 may check for a security violation. A security violation may be access from a restricted area and/or a restricted device. A user may configure a networking device 300 with rules to block access to devices in certain zones or at certain times. For example, wireless access to a living room may have been disabled during the workday as in FIG. 6. Further, a user may have established a whitelist of allowable user device, and the networking device 300 may consider any unregistered device a security violation. If the networking device 300 determines that a security violation has occurred, it may proceed to logging the violation at step 925. Else, the networking device 300 may proceed to altering beam criteria at step 930.

At step 925, the networking device 300 may log a security violation. For example, the networking device 300 may log the identity of the device, the position of the device, and/or the time of day. After logging the violation, the networking device may proceed to step 927. At step 927, the networking device 300 may block access to the detected device. For example, the networking device 300 may record the MAC address of the detected device in a blacklist, and ignore any further communication from the device.

At step 930, the networking device 300 may determine if the detected device is a client device or a router based on the identification made in step 915. For example, the networking device 300 may check the MAC address of the detected device against a database of a distributor's routers. If the address matches, it is a router, and if it does not, the networking device 300 treats it as a client device. If the detected device is a client device, the networking device 300 may proceed to step 935. If the detected device is a router, the networking device 300 may proceed to step 945.

At step 935, the networking device 300 may check to determine a priority for the detected device. In some instances, different clients may have higher or lower priorities. For example, a user who is a parent may configure the networking device 300 to prioritize his work laptop over his son's cell phone. In some instances, a networking device may provide services to multiple users or clients. For example, a service provider may enroll users in multiple tiers of service. The service provider may install a networking device 300 in public locations, such as a busy street or a football stadium. The networking device 300 may give priority to devices registered to users in higher tiers of service over lower tiers of service. The networking device 300 may consult a database to determine if a detected device is entitled to a higher priority or a lower priority relative to other connected devices. If the there are no priority settings, or if the detected device has a neutral priority, the networking device 300 may return to scanning for devices at step 905. If the device is determined to have a higher priority than other connected devices, the networking device may proceed to adjusting criteria to aim at the detected device in step 950. If the device is determined to have a lower priority, the networking device 300 may proceed to adjusting criteria to aim away from the detected device at step 955.

At step 945, the networking device 300 may determine if shared communication is desired with the detected device. For example, the networking device 300 may reference provisioning information stored in a database by a service provider to determine if the networking device 300 should bridge data services to the detected device such as is discussed in FIG. 5. If shared wireless communication is desired, the networking device 300 may proceed to adjusting criteria to aim toward the detected device at step 950. Else, the networking device 300 may proceed to adjusting criteria to aim away from the detected device at step 955.

At step 950, the networking device 300 may adjust criteria to aim at the detected device. For example, the networking device 300 may include an internal list of the signal strengths of connected devices. The networking device 300 may normally try to maximize the aggregate signal strength across all devices. However, at step 950, the networking device 300 may weight a prioritized detected device heavier than other devices, such that the networking device 300 will try to optimize a connection to the detected device at the expense of other devices. In the case of shared communication, the networking device 300 may set criteria that at least one antenna should be dedicated to communicating with the detected device.

At step 955, the networking device 300 may adjust criteria to avoid aiming at the detecting device. For example, if the detected device is a router with which shared communication is not desired, aiming a communication beam toward the detected device may create interference. To avoid such interference, the networking device 300 may adjust criteria to specify that wireless communications in the direction of the detected device determined at step 917 should be minimized.

At step 960, the networking device 300 may check to see if criteria for redirecting a beam have been met. For example, the networking device may determine that criteria set in steps 950 or 955 require a wireless beam to be adjusted. For example, criteria may establish that a device associated with a first user who receives a higher tier of service is receiving less signal, while a device associated with another user who receives a lower tier of service receives more signal. The networking device 300 may redirect a wireless beam toward the first user to compensate. In another example, the networking device 300 may determine that signal strength to a router sharing communication with the networking device 300 has diminished, and the networking device 300 should redirect a beam to achieve a stronger signal. If a wireless beam needs to be redirected, the networking device may proceed to step 965. Else, the networking device may return to scanning for wireless devices at step 905.

At step 965, the networking device 300 may redirect a wireless beam. For instance, the networking device 300 may use a beamforming technique to direct a wireless beam off an omni-directional antenna in a direction. In another instance, the networking device 300 may adjust the power or position of a directional antenna. For example, the networking device 300 may redirect power from one antenna in one direction to another antenna in a second direction. In another example, the networking device 300 may physically move a directional antenna from a first position facing a first direction to a second position facing a second direction. Once a beam has been redirected, the networking device 300 may return to scanning for a wireless device at step 905.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed is:

1. A method comprising:
   determining, at a first time, that a device identifier is associated with a wireless device at a second position; and
   causing, by a wireless router, an antenna to move, based on the device identifier, within a spherical housing so as to direct a wireless beam from a first position to the second position, wherein the spherical housing comprises a first port associated with the first position and a second port associated with the second position.

2. The method of claim 1, further comprising determining, by the wireless router and based on an input from a user, the first time.

3. The method of claim 1, further comprising:
   detecting, at the first time, the wireless device at the second position.

4. The method of claim 1, further comprising:
   determining, by the wireless router and based on an input from a user, to set the first position as a restricted zone;

determining, by the wireless router, that the wireless device is in the restricted zone; and sending, by the wireless router, a notification that the wireless device is in the restricted zone.

5. The method of claim 1, further comprising:

detecting, by the wireless router, a first user device at the second position; and determining by the wireless router, to follow the first user device, wherein the wireless beam is directed to the second position after the determining to follow the first user device.

6. The method of claim 1, further comprising:

detecting a first user device and a second user device; and determining, by the wireless router, to follow the first user device based on a determination that the first user device has a higher priority than the second user device.

7. The method of claim 1, further comprising:

detecting a first user device and a second user device; and determining, by the wireless router, to follow the first user device based on a determination that the first user device is entitled to receive a first tier of service that is higher than a second tier of service of the second user device.

8. The method of claim 1, wherein the wireless router is a Wi-Fi router for a local wireless network.

\* \* \* \* \*

UNITED STATES PATENT AND TRADEMARK OFFICE
CERTIFICATE OF CORRECTION

PATENT NO. : 11,129,077 B2
APPLICATION NO. : 14/796507
DATED : September 21, 2021
INVENTOR(S) : Bellis et al.

It is certified that error appears in the above-identified patent and that said Letters Patent is hereby corrected as shown below:

In the Specification

Column 6, Line 54:
Delete "310" and insert --300-- therefor

Signed and Sealed this
Second Day of May, 2023

Katherine Kelly Vidal
*Director of the United States Patent and Trademark Office*